United States Patent
Shreve et al.

(10) Patent No.: US 9,767,349 B1
(45) Date of Patent: Sep. 19, 2017

(54) LEARNING EMOTIONAL STATES USING PERSONALIZED CALIBRATION TASKS

(71) Applicant: Xerox Corporation, Norwalk, CT (US)

(72) Inventors: Matthew Adam Shreve, Webster, NY (US); Jayant Kumar, San Jose, CA (US); Raja Bala, Allen, TX (US); Phillip J. Emmett, Victor, NY (US); Megan Clar, Rochester, NY (US); Jeyasri Subramanian, San Antonio, TX (US); Eric Harte, Lancaster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/149,284

(22) Filed: May 9, 2016

(51) Int. Cl.
  *G06K 9/00* (2006.01)
  *G06K 9/62* (2006.01)

(52) U.S. Cl.
  CPC ..... *G06K 9/00335* (2013.01); *G06K 9/00228* (2013.01); *G06K 9/00268* (2013.01); *G06K 9/00302* (2013.01); *G06K 9/00315* (2013.01); *G06K 9/6269* (2013.01)

(58) Field of Classification Search
  CPC .......... G06K 9/00315; G06K 9/00228; G06K 9/00268; G06K 9/6269; G06K 9/00335; G06K 9/00342; G06K 9/00348; G06K 9/00302; G06F 3/00
  See application file for complete search history.

(56) References Cited

U.S. PATENT DOCUMENTS

| | | | |
|---|---|---|---|
| 6,049,281 A * | 4/2000 | Osterweil | A61B 5/1128 340/573.1 |
| 6,198,394 B1 * | 3/2001 | Jacobsen | A61B 5/1112 340/10.1 |
| 6,611,206 B2 * | 8/2003 | Eshelman | G06Q 50/22 128/920 |
| 6,879,709 B2 * | 4/2005 | Tian | G06K 9/00308 340/5.83 |

(Continued)

OTHER PUBLICATIONS

Viola et al.: "Robust Real-Time Face Detection." International Journal of Computer Vision 57(2) 2004, pp. 137-154.

(Continued)

*Primary Examiner* — Manav Seth
(74) *Attorney, Agent, or Firm* — Fay Sharpe LLP

(57) ABSTRACT

A method for determining an emotional state of a subject taking an assessment. The method includes eliciting predicted facial expressions from a subject administered questions each intended to elicit a certain facial expression that conveys a baseline characteristic of the subject; receiving a video sequence capturing the subject answering the questions; determining an observable physical behavior experienced by the subject across a series of frames corresponding to the sample question; associating the observed behavior with the emotional state that corresponds with the facial expression; and training a classifier using the associations. The method includes receiving a second video sequence capturing the subject during an assessment and applying features extracted from the second image data to the classifier for determining the emotional state of the subject in response to an assessment item administered during the assessment.

21 Claims, 12 Drawing Sheets

(56) References Cited

U.S. PATENT DOCUMENTS

| | | | | |
|---|---|---|---|---|
| 6,964,023 | B2* | 11/2005 | Maes | G06F 3/0481 704/E15.041 |
| 7,203,356 | B2* | 4/2007 | Gokturk | G06K 9/00228 375/E7.083 |
| 7,319,779 | B1* | 1/2008 | Mummareddy | G06K 9/00288 382/118 |
| 7,624,076 | B2* | 11/2009 | Movellan | G06K 9/00248 706/12 |
| 7,921,036 | B1* | 4/2011 | Sharma | G06Q 20/3674 705/14.49 |
| 9,008,416 | B2* | 4/2015 | Movellan | G06K 9/00302 382/159 |
| 9,147,129 | B2* | 9/2015 | Liu | G06N 99/005 |
| 9,345,404 | B2* | 5/2016 | Proud | A61B 5/0022 |
| 9,443,167 | B2* | 9/2016 | Movellan | G06K 9/00302 |
| 9,507,417 | B2* | 11/2016 | Dal Mutto | G06F 3/012 |
| 9,578,049 | B2* | 2/2017 | Sridhara | H04L 63/1425 |
| 9,589,365 | B2* | 3/2017 | Zhao | G06K 9/00348 |
| 9,594,807 | B2* | 3/2017 | Rappoport | G06Q 10/101 |
| 9,600,711 | B2* | 3/2017 | Shreve | G06K 9/00228 |
| 9,646,655 | B2* | 5/2017 | Carter | G11B 27/34 |
| 2003/0133599 | A1* | 7/2003 | Tian | G06K 9/00308 382/118 |
| 2016/0027474 | A1* | 1/2016 | Chao | H04N 21/44008 386/241 |
| 2016/0220198 | A1* | 8/2016 | Proud | A61B 5/4809 |
| 2017/0098122 | A1* | 4/2017 | El Kaliouby | G06K 9/00308 |

OTHER PUBLICATIONS

Saragih et al.: "Face Alignment Through Subspace Constrained Mean-Shifts." The Robotics Institute, Carnegie Mellon University Pittsburgh, PA 15213 USA pp. 1-8, Sep. 2009.

Ahonen et al.: "Face Recognition with Local Binary Patterns", Springer Berlin Heidelberg 2004, 3021, pp. 469-481.

Divjak et al.: "Real-Time Video-Based Eye Blink Analysis for Detection of Low Blink-Rate During Computer Use." Institute for Computer Graphics and Vision, Graz University of Technology, Austria, 9 ppgs, Jan. 2008.

Drutarovsky et al.: "Eye Blink Detection Using Variance of Motion Vectors" Vision and Graphics Group, Faculty of Informatics and Information Technologies, Solvak University of TEchnology in Bratislava, Slovakia 13 ppgs., 2015.

Horn et al.: "Determining Optical Flow". Artificial Intelligence 1981, 17, 185-203.

Lucas et al: "An Iterative Image Registration Technique with an Application to Stereo Vision." Proc 7th International Joint Conference on Artificial Intelligence 1981, Vancouver, BC, pp. 674-679.

Alghowinem et al.: . Eye Movement Analysis for Depression Detection. In ICIP (2013) (5 pgs.).

Whitehill et al.: "The Faces of Engagement: Automatic Recognition of Student Engagement from Facial Expressions," Affective Computing, IEEE Transactions on , vol. 5, No. 1, pp. 86,98, Jan.-Mar. 1, 2014.

Whitehill et al: "Automatic Facial Expression Recognition for Intelligent Tutoring Systems," Computer Vision and Pattern Recognition Workshops, 2008. CVPRW '08. IEEE Computer Society Conference Jun. 2008, 6 pp.

Shreve et al: "Macro- and Micro-Expression Spotting in Long Videos Using Spatio-Temporal Strain," Automatic Face & Gesture Recognition and Workshops (FG 2011), 2011 IEEE International Conference, Mar. 2011 6 pp.

Cao et al.: "Facial Expression Recognition Based on LBP-EHMM," Image and Signal Processing, 2008. CISP '08. Congress on , vol. 2, No., pp. 371,375, May 27-30, 2008.

Dahmane et al.: "Emotion recognition using dynamic grid-based HoG features," Automatic Face & Gesture Recognition and Workshops (FG 2011), 2011 IEEE International Conference on , vol., No., pp. 884,888, Mar. 21-25, 2011.

Awais et al.: "Automated Eye Blink Detection and Tracking Using Template Matching", IEEE Student Conference, Putrajaya, 2013, pp. 79-83.

Yan et al.: "Face Liveness Detection by Exploring Multiple Scenic Clues", ICARCV 2012, 6 pgs.

Pan et al.: "Eyeblink-based Anti-spoofing in Face Recognition from a Generic Webcamera", Computer Vision 2007; ICCV 2007; and IEEE 11th Int'l Conf., Rio de Janeriro, 2007, pp. 1-8.

* cited by examiner

LEARNING EMOTIONAL STATES USING PERSONALIZED CALIBRATION TASKS

BACKGROUND

The present disclosure is directed to a system and method for learning an involuntary physical characteristic and an associated underlying emotional state of a subject using automatic classification techniques. The disclosure finds application in an educational setting, but is amenable to other settings as well.

In a conventional vision-based facial expression recognition system, a computer is programmed to recognize certain facial expressions that indicate emotions. For example, a frown is recognized to indicate displeasure, and the computer is programmed to associate that facial expression with that emotion. Generally, certain facial expressions, such as smiles and frowns, are universally recognized across populations, as most human subjects voluntarily exhibit these expressions while experiencing certain emotions. Conventional systems have learned to classify a facial expression into one of a number of predetermined sentiments or emotional states.

Conventional emotion recognition systems have used multiple approaches, such as local binary patterns (LBP) and Histogram of Gradient (HoG) features, to learn facial expressions from video sample datasets that typically contain multiple subjects performing several prototypical and universal facial expressions that indicate happiness, sadness, anger, among other emotions. For instance, if happiness or sadness is of interest, then it may be feasible for the conventional system to solicit a smile and frown from a subject. Moreover, these types of facial expressions are considered "universal" in the sense that the expressions are commonly exhibited for happiness and sadness is recognizable to most people. These systems can be precise at detecting a set of artificially induced facial expressions. Alternatively, another approach used for generic facial expression recognition is known as "expression spotting", where spatial-temporal strain is used to determine moments in videos where facial deformation occurs.

However, other types of expressions are not as universal and show large inter-subject variability. Individuals can exhibit other facial characteristics—sometimes symptoms—under certain conditions of stress, anxiety, confusion, and pleasure, etc. Each individual may react to certain conditions differently, and his or her emotional response, referred herein as also being a physical trait, can be involuntary. Blinking, rigid head motions, and biting of lips, etc., are only a few non-limiting example facial characteristics that manifest as an emotional response. Conventional systems are unable to sufficiently detect the involuntary physical traits or manifestations of individualized emotional states or responses. Particularly, the task of collecting multiple samples of subjects imitating mostly involuntary facial characteristics can be difficult. Furthermore, subjects may voluntarily act out the intended facial behavior differently.

One setting where facial recognition can be used to identify emotional states is in education. A teacher or educational system may desire to predict how a student is performing, or struggling, on an assessment or on specific questions using facial recognition. Previous approaches for assessing a student's emotional state included self-reports and teacher assessments. These were often cumbersome, and were instantaneous rather than continuous, longitudinal analyses of the student's affective ("emotional") state. The computer vision approach for facial recognition provides a non-obtrusive method of monitoring a student's emotional state with high temporal resolution over a long period of time.

In "The Faces of Engagement: Automatic Recognition of Student Engagement from Facial Expressions", *Affective Computing, IEEE Transactions*, vol. 5, no. 1, pp. 86-98 (2014), by J Whitehill et al., levels of engagement are learned in a natural setting by presenting students with standardized assessments. Data is collected from a large pool of subjects, with labels being generated from subjective evaluations by expert judges. An engagement recognition engine is trained using the pooled data. In "Automatic facial expression recognition for intelligent tutoring systems", *Computer Vision and Pattern Recognition Workshops*, pp. 1, 6, 23-28 (2008), by Whitehill, et. al., a similar approach is disclosed using a regression technique.

FIG. 1 shows a conventional facial recognition approach 10 according to the PRIOR ART. The method starts at S12. Mainly, a computer is programmed to process a video frame or still image to detect a face at S14. Facial registration (alignment) and normalization is performed on the image once the face is detected at S16. Next, features are extracted in the facial region of interest at S18. At S20, the features are used to train a classifier, where the features are annotated by a label of the input video frame or still image. The method ends at S22.

However, one setback with these conventional computer vision approaches is the inherent limitations in accuracy since the classifiers are trained on pooled training data and emotional states vary highly from individual to individual.

Thus a personalized and natural approach is desired to automatically learn, in an unsupervised or semi-supervised fashion, the association between individuals' involuntary, physical facial characteristics and their underlying emotional states. A system and approach are desired which can rely on the standard core modules of a conventional facial recognition system.

BRIEF DESCRIPTION

One embodiment of the disclosure relates to a method for determining an emotional state of a subject taking an assessment. The method includes generating a calibration task to elicit predicted responses from a subject administered the task. Each portion of the task is intended to elicit a certain emotional response that conveys a baseline characteristic of the associated subject. The method also includes receiving video data capturing the associated subject performing the calibration task, wherein each frame of the video data is synchronized within the task to correspond to a portion of the task. The method includes processing the image data for determining an observable physical behavior experienced by the subject across a series of frames during the each portion of the task. The method includes detecting an emotional response experienced by the subject across the series of frames corresponding to the each portion of the task. The method includes associating, such as tagging, the observed behavior with one of multiple emotional categories or labels. Each category or label corresponds with one of the emotional responses. The method also includes training a classifier using features extracted from the image data. Each class is one of the categories associated with the observed behavior.

Another embodiment is directed to a method for determining an emotional state of a subject taking an assessment. The method includes generating sample questions to elicit predicted facial expressions from an associated subject administered the questions, wherein each question is intended to elicit a certain facial expression that conveys a baseline characteristic of the subject. The method includes receiving a video sequence capturing the subject answering the questions. Each frame of the video sequence is synchronized within a sample question. The method includes determining an observable physical behavior experienced by the subject across a series of frames corresponding to the sample question. The method includes detecting a facial expression conveyed by the associated subject across the series of frames corresponding to the question. The method includes associating, or tagging, the observed behavior with the emotional state that corresponds with the facial expression. The method further includes training a classifier using the associations. The method includes receiving a second video sequence capturing the associated subject during an assessment administered after the sample questions and applying features extracted from the second image data to the classifier for determining the emotional state of the associated subject in response to an assessment item administered during the assessment.

Another embodiment of the disclosure is directed to a calibration system for determining an emotional state of a subject taking an assessment. The system includes a processor and a non-transitory computer readable memory storing instructions that are executable by the processor. The processor is programmed to perform the operation of generating a calibration task to elicit predicted responses from a subject administered the task. Each portion of the task is intended to elicit a certain emotional response that conveys a baseline characteristic of the subject. The processor is further programmed to perform the operation of receiving image data from an image capture device capturing the associated subject performing the calibration task. Each frame of the image data is synchronized to correspond to a portion of the task. The processor is programmed to perform the operation of determining an observable physical behavior experienced by the subject across a series of frames during the portion of the task. The processor is programmed to perform the operation of detecting an emotional response experienced by the subject across the series of frames corresponding to the portion of the task. The processor is programmed to perform the operation of associating, or tagging, the observed behavior with one of multiple emotional categories (or labels), wherein each category (or label) corresponds with one of the emotional responses. The processor is programmed to perform the operation of training a classifier using the associations. The processor is programmed to perform the operation of receiving second image data capturing the associated subject during an assessment administered after the calibration task and applying features extracted from the second image data to the classifier for determining the emotional state of the subject in response to an assessment item administered during the assessment.

INCORPORATION BY REFERENCE

G. Pan, L. Sun, Z. Wu and S. Lao, "Eyeblink-based Anti-Spoofing in Face Recognition from a Generic Webcamera," Computer Vision, 2007. ICCV 2007. IEEE 11th International Conference on, Rio de Janeiro, 2007, pp. 1-8, is totally incorporated herein by reference.

M. Awais, N. Badruddin and M. Drieberg, "Automated eye blink detection and tracking using template matching," Research and Development (SCOReD), 2013 IEEE Student Conference on, Putrajaya, 2013, pp. 79-83, is totally incorporated herein by reference.

DETAILED DESCRIPTION

The present disclosure is directed to a system and method for learning an involuntary physical characteristic or behavior and an associated underlying emotional state of a subject using automatic classification techniques. A calibration task is used to learn specific characteristics of a subject to certain emotions. The disclosure automatically learns and detects a baseline characteristic specific to a subject by using a calibration task customized for the subject. The calibration task is specially selected for the subject and intended to have a reasonable likelihood of eliciting the desired internal emotion state in the subject.

As used herein, an "emotional state" can include any known emotion, such as, stress, frustration, confusion, concentration, distraction, among others including engagement, boredom, confusion, relaxation, comfort, etc. There is no limit herein to the emotional state(s) identified in training a classifier. Nor is there a limit made herein to the classification value associated with an emotional state.

As used herein, a baseline characteristic, a physical characteristic, an emotional response have synonymous meaning and can include, as examples only, blinking, eye brow movement, lip movement (pulling and biting), nose movement (wrinkles), etc. There is no limit made herein to the type of facial movement characterized by the system.

Figure 2:
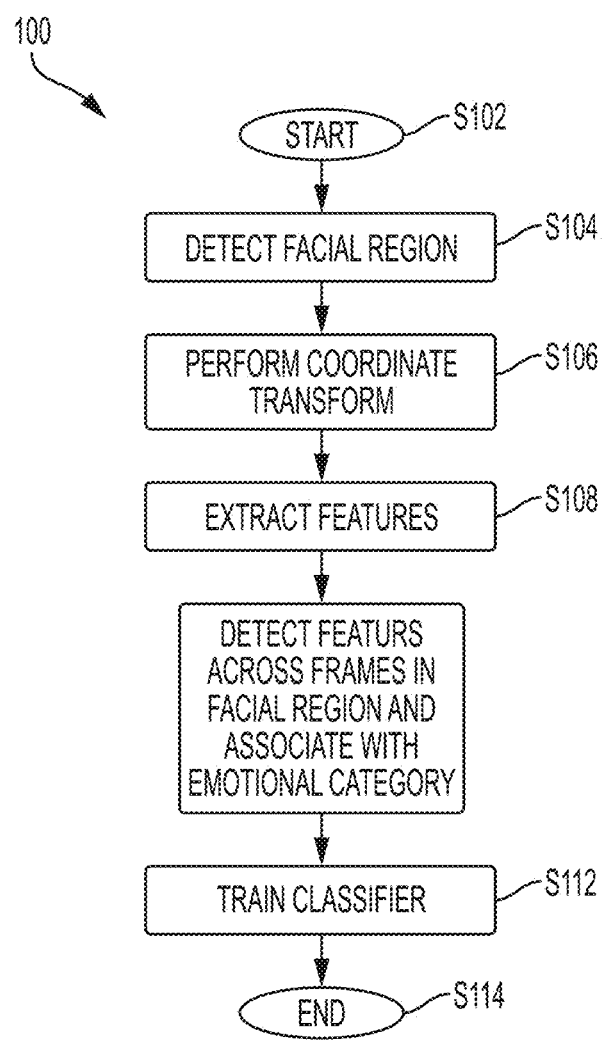
FIG. 2 shows an overview of a facial recognition method according to the disclosure.

An overview of the method is shown in the flowchart of FIG. 2. The method 100 starts at S102. Mainly, a computer is programmed to process a video frame or still image (hereinafter collectively referred to as "image frames") to detect a facial landmark ("region of interest") of a subject or participant taking a calibration task at S104. A coordinate transform is performed on the region of interest across multiple image frames at S106. In other words, a geometric transform is used to align and normalize the facial landmark across the multiple image frames. Next, features are extracted in the facial region of interest at S108. The features are needed to build labels corresponding to the emotional state experienced by the subject during the calibration task. The label is obtained using the calibration task designed to elicit from the subject an involuntary emotional response or physical characteristic associated with the emotional state. At S110, the geometrical features in the facial region of interest are detected across the image frames and associated with an emotional category that corresponds to the targeted emotional state. At S112, the features are used to train a classifier, where the features are annotated by a label of the input video frame or still image. The method ends at S114.

Figure 3:
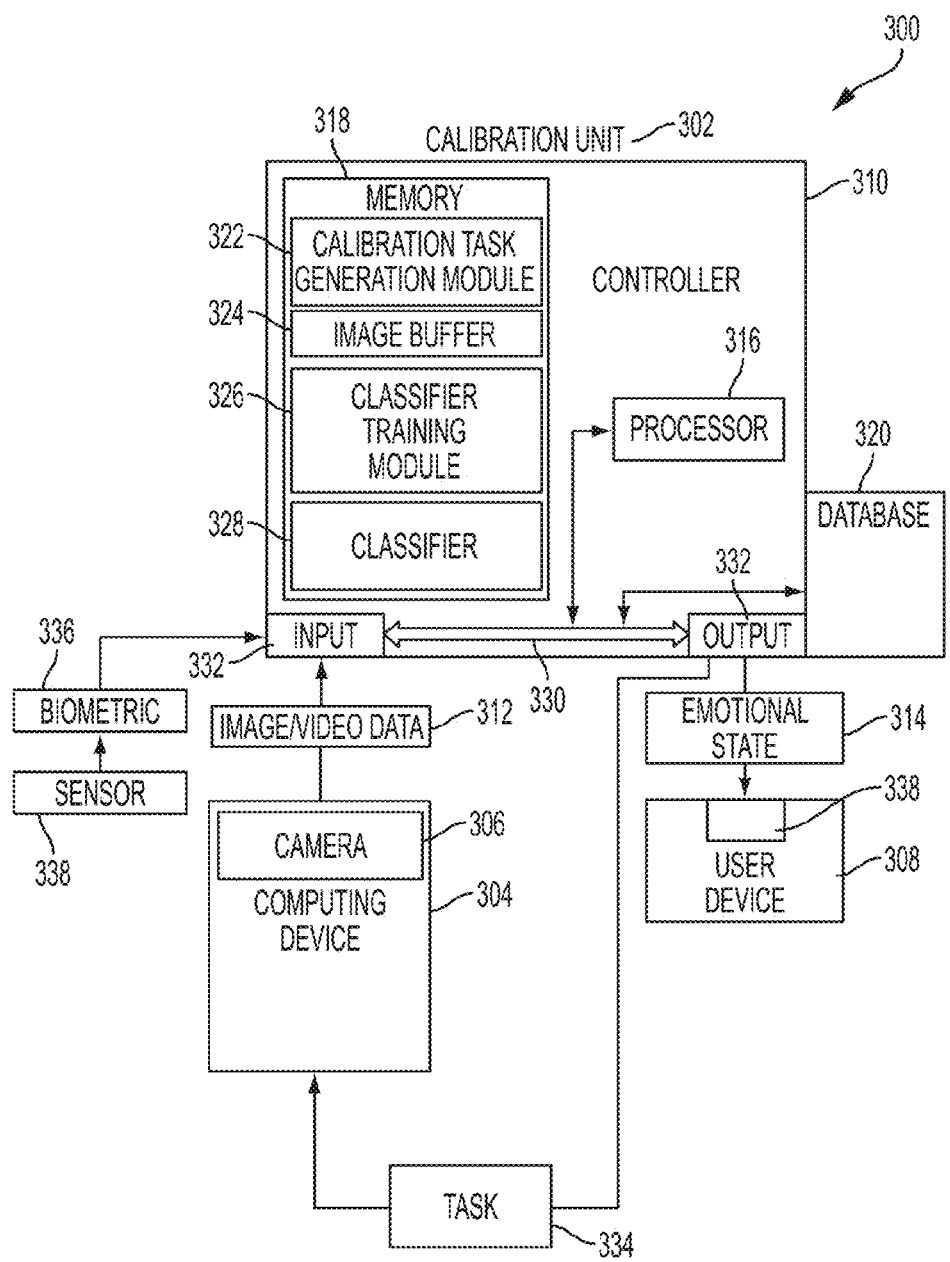
FIG. 3 shows a schematic of an emotional state calibration system according to the disclosure.

FIG. 3 is a schematic illustration of an emotional state calibration system 300 ("system 300") for learning the association between involuntary, physical facial characteristics and the underlying emotional states that elicit the behavior. The system 300 includes a calibration unit 302 and a mobile computing device 304, including a camera 306 among other features, which can be linked together by communication links, referred to herein as a network. In one embodiment, the system 300 may be in further communication with a user device 308. These components are described in greater detail below.

The calibration unit 302 illustrated in FIG. 3 includes a controller 310 that is part of or associated with the calibration unit 302. The exemplary controller 310 is adapted for controlling an analysis of image data 312 received at the calibration unit 302 and determining an emotional state 314, among other operations. The controller 310 includes a processor 316, which controls the overall operation of the calibration unit 302 by execution of processing instructions that are stored in memory 318 connected to the processor 316.

The memory 318 may represent any type of tangible computer readable medium such as random access memory (RAM), read only memory (ROM), magnetic disk or tape, optical disk, flash memory, or holographic memory. In one embodiment, the memory 318 comprises a combination of random access memory and read only memory. The digital processor 316 can be variously embodied, such as by a single-core processor, a dual-core processor (or more generally by a multiple-core processor), a digital processor and cooperating math coprocessor, a digital controller, or the like. The digital processor, in addition to controlling the operation of the calibration unit 302, executes instructions stored in memory 318 for performing the parts of the method outlined in FIG. 4. In some embodiments, the processor 316 and memory 318 may be combined in a single chip.

The calibration unit 302 may be embodied in a networked device, such as the mobile computing device 304, or it may be located elsewhere on a network to which the system 300 is connected, such as on a central server, a networked computer, or the like, or distributed throughout the network or otherwise accessible thereto. In other words, the processing can be performed within the calibration unit 302 on site or in a central processing offline or server computer after transferring the electronic image data 312 information retrieved from the camera 306 through a network. In another embodiment, the image data 312 may be received as input from any suitable source, such as a workstation, a database, a memory storage device, such as a disk, or the like, such as, for example, the database or storage 320 connected to or in communication with the calibration unit 302.

The stages disclosed herein are performed by the processor 316 according to the instructions contained in the memory 318. In particular, the memory 318 stores a calibration task generation module 322, which generates a calibration task to elicit predicted responses from a subject administered the task and transmits the task to the mobile computing device 304; an image buffer module 324 that receives image data capturing the subject performing a calibration task, where each frame of the image data is synchronized within the task to correspond to a portion of the task; a classifier training module 326, which processes the image data for determining an observable physical behavior experienced by the subject across a series of frames during each portion of the task, detects an emotional response experienced by the subject, and associates the observed behavior with one of multiple predetermined emotional categories each corresponding with the emotional response, and trains a classifier using the associations; and the classifier 328, which applies features extracted from subsequent image data for determining the emotional state of the subject in response to an assessment item administered during an assessment. Embodiments are contemplated wherein these instructions can be stored in a single module or as multiple modules embodied in different devices. The modules 322-328 will be later described with reference to the exemplary method.

The software modules as used herein, are intended to encompass any collection or set of instructions executable by the calibration unit 302 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the calibration unit 304 may be all connected by a bus 330.

With continued reference to FIG. 3, the calibration unit 302 also includes one or more communication interfaces 332, such as network interfaces, for communicating with external devices. The communication interfaces 332 may include, for example, a modem, a router, a cable, and and/or Ethernet port, etc. The communication interfaces 332 are adapted to receive the image data 312 as input or send a calibration task 334 or an emotional state classification 314 as output.

The calibration unit 302 may include one or more special purpose or general purpose computing devices, such as a server computer, controller, or any other computing device capable of executing instructions for performing the exemplary method.

FIG. 3 further illustrates the calibration unit 302 connected to the mobile computing device 304, including a camera 306, for capturing and/or providing the image data 312 in electronic format. The image data 312 undergoes processing by the calibration unit 302 to output a classification or emotional state category 314. However, to perform the operations, the calibration unit 302 can also use additional input data. In one embodiment, this information can include sensor data 336. Using a sensor 338, the system 300 can monitor the subject during the calibration task, where the sensor measures a biometric 336 indicative of the emotional state of the subject.

Furthermore, the system 300 can display the classification 314 and/or desired output in a suitable form on a graphic user interface (GUI) 338 at the user device 308. The GUI 338 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 316. Furthermore, in one contemplated embodiment, the output information can be transmitted to another computer application, which can perform additional processing on the output.

Figure 4:
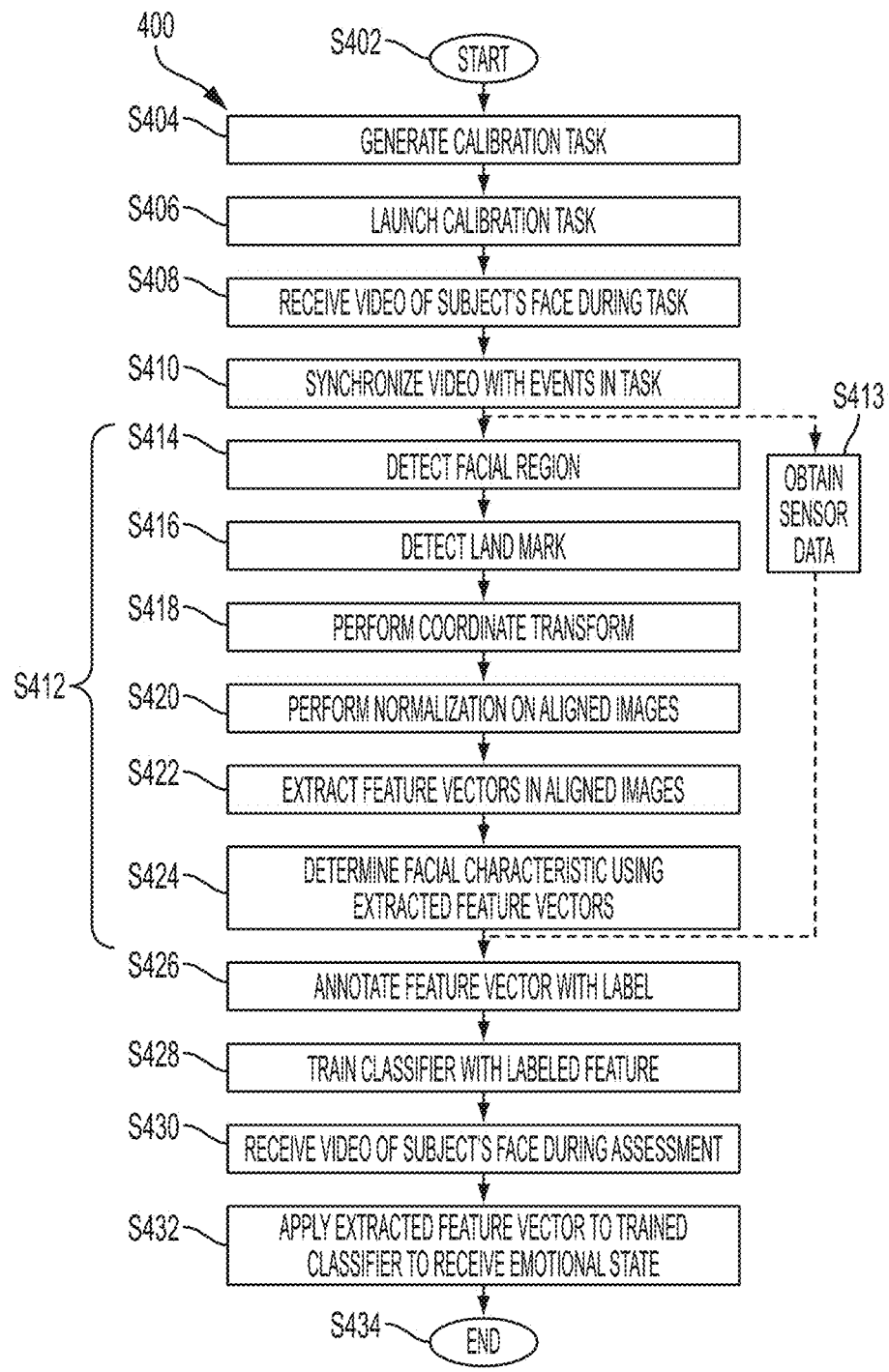
FIG. 4 shows detailed method for performing an emotional state classificaiton according to the disclosure.

FIG. 4 shows a detailed method 400 for performing an emotional state classification according to the disclosure. The method starts at S402. At S404, the computer (i.e., the calibration unit 302) is programmed to generate a calibration task, which is designed to evoke certain emotional states that can be predicted through the subject's facial expression(s), i.e., the facial expressions exhibited by the subject performing the calibration task. In an education setting, which is used herein for illustration purposes only, one example calibration task can be in the form of a quiz, where questions are presented on a variety of topics at different levels of difficulty, length, and clarity. In the contemplated embodiment, each of the questions should cover differing skill levels. Because each subject performing the calibration task has a different aptitude in varying disciplines, the questions can take into account the subject and its presumed abilities (such as, for its age or cognitive level). For example, in one calibration task, at least one question can cover a grade school level problem, and a different question can cover a higher education level problem. The variety of skill levels are intended to elicit emotional responses that correspond with the difficulty level of the questions. For example, the questions associated with higher levels of difficulty are intended to create stress or anxiety in the subject and the questions associated with lower levels of difficulty are intended to relax the subject or make the subject comfortable and happy. The calibration task is created to cause the subject to experience more than one emotional state.

Figure 5A:
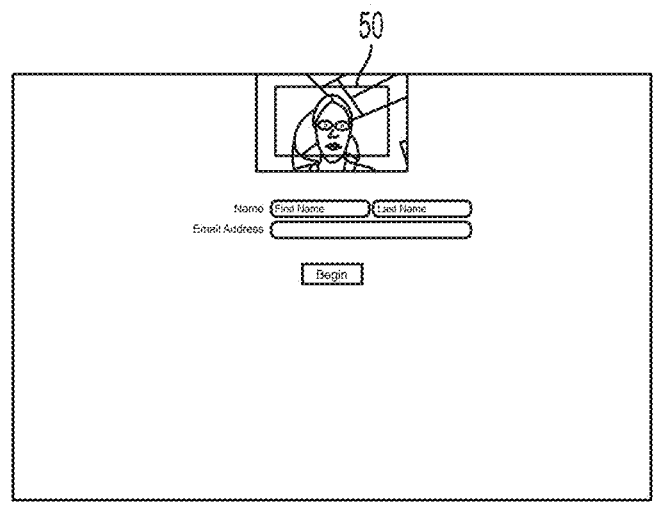
FIG. 5A is a login interface for initiating a calibration task customized for the subject.
Figure 5B:
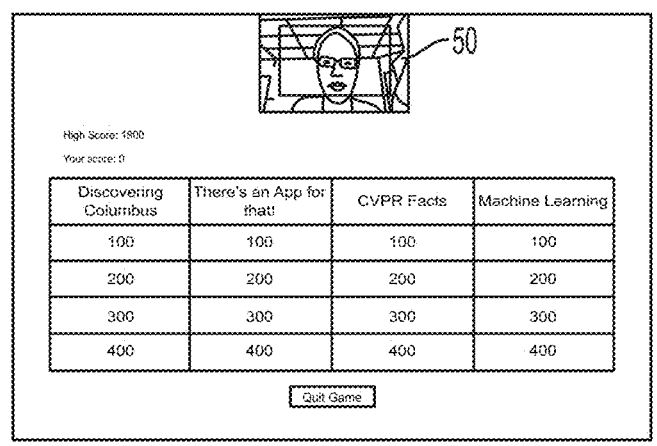
FIG. 5B is an example interface screen showing sample questions in a quiz-like calibration task.
Figure 6A:
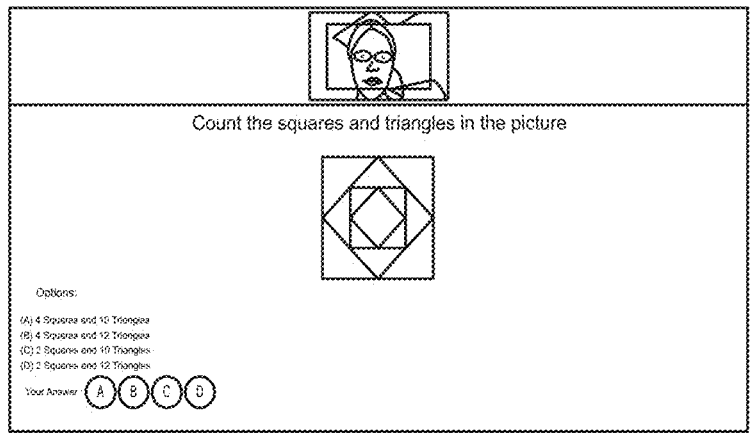
FIGS. 6A-B show another example display screen presenting tasks that prompt the subject to interact with the display.
Figure 6B:
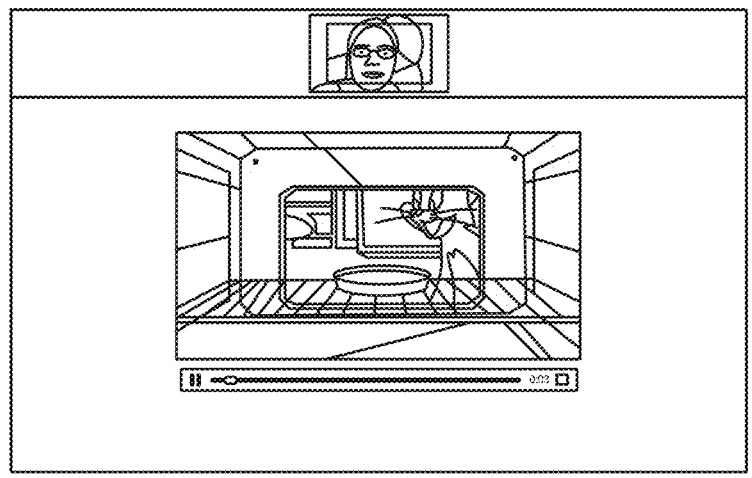

In one embodiment, the calibration task generation unit 322 creates a quiz with questions in different categories, such as the game shown in FIG. 5B. FIG. 5B is an example display screen 400 showing sample questions in a sample quiz, modeled similar to the television game show called Jeopardy™. FIGS. 6A-B show another example display screen presenting tasks that prompt the subject to interact with the display. In the contemplated embodiments, the subject interacts with an application interface.

Returning to FIG. 4, the calibration task is launched at S406 on the mobile computing device. More specifically, the subject can interact with a mobile computing device 304, such as a laptop, smart pad, tablet, or the like, including a graphical interface for presenting the tasks. There is no limitation made herein to the type of task presented on the mobile computing device. Such tasks can be in the form of written questions, pictorial questions, and combinations of the both. FIG. 6A shows a sample pictorial question with a multiple choice answer, where the subject interacts with the interface to select one of the multiple choice answers. FIG. 6B shows a video clip which the subject is instructed to view and then a multiple choice question follows, where the subject again interacts with the interface to input an answer. The questions can be presented in any form, wherein FIGS. 6A-B display the questions in the form of a wizard menu, but there is no limitation made herein to the display of such tasks.

The purpose of the calibration task is to find the behaviors exhibited by each subject when certain emotional responses are elicited, such as, stress and anxiety, etc. Learning these behaviors enables the user—administering future assessments and tasks—to identify the subject's emotions, such as when the subject is struggling, during portions of the future assessment. To this end, the subject is known before the calibration task is initiated. FIG. 5A shows a sample login screen where a subject enters its name, as one example only, before beginning the calibration task.

Once the calibration task is in session, video is captured of the subject's face at S408. To accomplish the purpose, the system includes a camera 306, which captures the subject taking the calibration task. In the contemplated embodiment, a forward-facing camera can be included on the mobile computing device 304 such that the subject's facial region can be within the camera's field of view when the user is interacting with the task. FIGS. 5A-B and 6A-B show a live image 50 of the subject displayed on the interface, thus verifying that the subject is in the camera's field of view.

The camera 306 captures the facial characteristics or involuntary behaviors exhibited by each subject when certain emotional responses are triggered. For some subjects, the behavior may include an increased blink-rate, lip biting, teeth grinding (as recognized by jaw movement), tilt of the head or other head motion, a prototypical smile or a confused facial expression. The system aims to detect the behaviors or facial characteristics that do not fit into a standard emotional category. Once the physical behavior is learned by the system for the individual subject, instances of the specific response can be found in future videos of that same subject.

First, the video data is synchronized with events within the calibration task at S410. Video segments or sequences of frames can be retrieved corresponding to specific portions of the calibration task, such as a duration when a specific question was presented and response received as input.

Next, at S412, the video data is processed to determine likely instances of certain emotions. As discussed, supra, the portions of the calibration task were created at different difficulty levels, each corresponding to a specific emotional state. The targeted emotional responses are ones that are difficult to fake, possibly involuntary, and are not necessarily common for all subjects.

More specifically, the video data is analyzed to determine the behavioral/facial characteristics exhibited by the subject during the portions of the calibration task created to elicit a corresponding specific emotional state.

In one embodiment, a classification approach is used to train a classifier on known emotional responses. The video or image sequences of one or more subjects exhibiting an emotion or behavior are labeled based on ground-truth labeling. These labels are automatically generated for video sequences capturing the subject after the calibration task is used to trigger the emotion. Using the classification technique, the response time, difficulty level of the calibration task, and the quality of the response to the task can be used as soft-labels for indicating the emotion.

In one embodiment, the ground truth information can be obtained using a biomedical sensor 336 at S413, which collects biometrics of the subject during the calibration task. The subject can be instrumented with at least one sensor (e.g. a biosensor) in order to obtain a ground truth corresponding to the internal state. In one illustrative example, a heart rate or BP monitor can measure a value indicative of stress. The ground truth can also or alternatively be based on expert opinion.

The ground truth data is used in a learning stage that trains the classifier for detecting future instances of such behaviors (detection stage). Features and metrics that are extracted from the subjects during both the learning and detection stages include, inter alia, blink rates, head motions, motion on the face (mouth, lips, eyes, nose, etc.), and face expressions, etc. The classifier may be trained on single subjects to find behaviors specific to an individual subject or on multiple subjects to find intra-subject patterns. Those tasks that best correlate with an intended state across a population can be used to elicit the same response in future data collections.

In a different embodiment, an anomaly detection can be used to detect deviations from a baseline normal behavior observed during the calibration task. In this embodiment, a ground-truth may not be known. Instead, the subject's behaviors observed to be different from its normal behavior (i.e., relative to each individual separately, or across several individuals) can be later interpreted after unsupervised classification. In this embodiment, the calibration task is designed to first establish a "neutral" state, and then the task evokes deviations from this neutral state. An anomaly detection algorithm is then used to detect sequences where the behavior characteristics are inconsistent with a subject's automatically detected neutral state.

Figure 7:
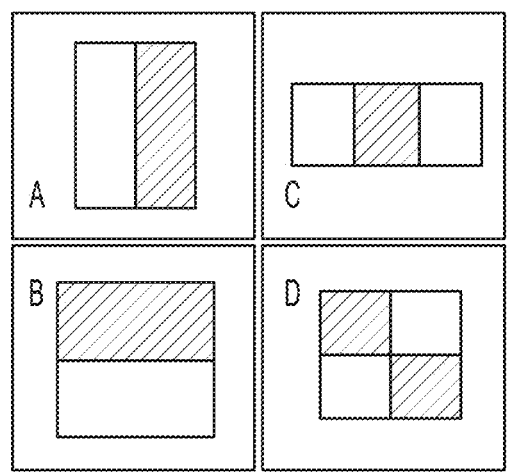
FIG. 7 shows sample Haar features used to detect a facial region of interest in image data.

Regardless of which approach is used, the first step in the analysis of the video frames is to detect the subject's facial region of interest at S414. Any known landmark detection algorithm can be performed to detect the facial region. In one embodiment, a Viola-Jones face detection method can be based in part on simplifications of more complex Haar wavelets. FIG. 7 shows sample Haar features. The rectangular features are calculated from the image frame by subtracting one particular summed region (the shaded regions in FIG. 7) of an image from an adjacent region (white region) of the image.

The main advantage of using these course features is that their shape enables the use of a summed area table (integral image), which allows the calculation of all possible rectangular shapes in an image frame to be calculated in constant time after performing a single raster scan. However the total number of permutations of these shapes at a base resolution of 24×24 pixels results in over 45,396 features. Therefore, Adaboost can be used to form a cascade of several week classifiers in order to form a strong classifier that only requires roughly 10% of the number of original features. This same approach has also been applied to detection of several facial landmarks on the face, including the eyes, ears, nose and mouth, as well as other body parts such as hands, torso, etc.

Returning to FIG. 4, after the Viola-Jones face detector is used to determine the facial regions at S414, a Deformable Part-Based Models ("DPM") is deployed within this facial region of interest to detect a landmark at S416. When solely using landmark detection algorithms like the Viola-Jones detector, it may be difficult to find parts on the face that are distorted, skewed or occluded due to pose or large facial deformations. Moreover, it may be necessary to keep track of several locations on the face over several frames where these adverse conditions are likely to occur, such as, for instance, if the analysis is performed on every frame in a video, or if multiple frames are used to reach conclusions (as is the case with the motion-based approaches). One method that can be used to detect the landmark is the deformable part-based models (DPM). Instead of treating each landmark independently, DPMs construct connections (or geometric priors) between each landmark, indicating the likely locations of the landmark(s) given that at least a few are detected with sufficient confidence.

In a basic DPM, the following score function S is optimized:

$$S(p_1, \ldots, p_n) = \Sigma_{i=1}^{n} m_i(p_i) - \Sigma_{(i,j) \in E} d_{ij}(p_i, p_j) \quad (1)$$

where S is determined by the response function m (classification or filter confidence) minus the cost d associated with the relative location of each pair of points (geometric prior). Note that the optimization function in the present case selects for the best match score of each point p. However, this selection may lead to error in the case of local maxima.

A more robust approach converges on the mean location from several response values in a neighborhood determined by the geometric priors (essentially a mean shift). First, the overall algorithm decides on a window size around each data point. A window size of n×n (e.g., 25×25 pixels) is typically used. Second, a mean of the kernel density estimate (KDE) is computed for all the data within this window. The KDE is measured for each facial landmark using an isotropic Gaussian kernel of the form:

$$P(l_i = \text{aligned} | x) = \Sigma_{\mu_i \in \Psi_{x_i^c}} \alpha_{\mu_i}^i N(x_i^\tau; \mu_i, \sigma^2 I) \quad (2)$$

where $\alpha_{\mu_i}^i$ are weights associated with the response map (i.e., the classification results for matching labeled features within the window), $\Psi_{x_i^c}$ is a grid or subset of candidate shifts around the current shape estimate $x_i^c$ (in order to speed up computation), and $\sigma$ is an a-priori estimate.

Third, the window is shifted to the mean. The KDE is plugged into a standard mean shift function:

$$x_i^{(\tau+1)} \leftarrow \frac{\sum_{\mu_i \in \Psi_{x_i^c}} \alpha_{\mu_i}^i N(x_i^\tau; \mu_i, \sigma^2 I) \mu_i}{\sum_{\mu_i \in \Psi_{x_i^c}} \alpha_{\mu_i}^i N(x_i^\tau; \mu_i, \sigma^2 I)} \quad (3)$$

where $\tau$ denotes an iterative time step. In other words, the first, second and third steps are iteratively repeated until a convergence criterion is met.

An additional step can employ a point distribution model (PDM) so that the system can constrain the possible parameters of the landmarks between iterations including allowable rotations, scale changes, and translations.

Continuing with FIG. 4, the image undergoes a coordinate transform so that faces from multiple subjects properly align at S418. After the face boundary is determined, registration is performed on the selected sequence image frames to align and crop some canonical representation of the face. This alignment helps ensure that the features to be extracted in specific regions of the face are consistent over time for a single subject, as well as across multiple subjects. A geometric transform that uses a transformation matrix M can be used to perform this alignment. However, in order to estimate the coefficients of M, points on the object—that are present in all examples (for instance, the eyes, mouth, ears, etc.)—need to be identified. Essentially, an object (in this case, a face) in one scene ("image frame") is spatially warped to match that of an object in another scene. The transformation is achieved by solving a transformation matrix M, which contains the coordinate transform from image I to image T.

After the face has been aligned and cropped, normalization is then performed at S420. The goal of normalization is to reduce the disparity in lighting, image noise, and other adverse conditions in the image before higher-level processing is performed. Depending on the features used in later stages, different normalization techniques may be performed such as histogram equalization, noise filtering (median or smoothing filter). For instance, histogram equalization is typically not very useful for edge-based features, but is useful for techniques such as principle component analysis (PCA) or linear discriminant analysis (LDA). For edge or texture-based features, an impulse noise removal (median filtering) can be performed due to the likelihood that this type of noise can cause spurious edges and corners.

Figure 8A:
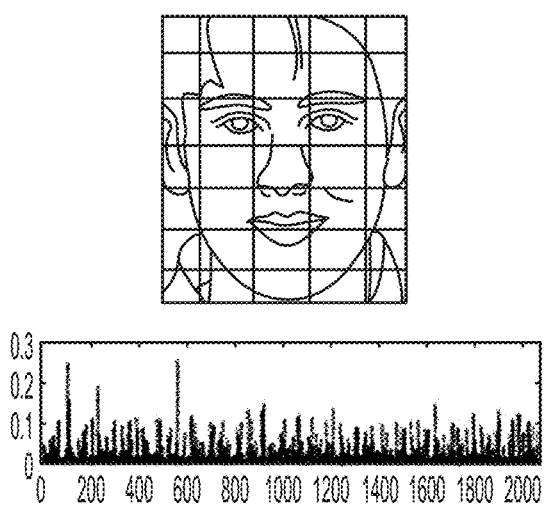
FIGS. 8A-B shows illustrative LBP features extracted for a facial region.
Figure 8B:
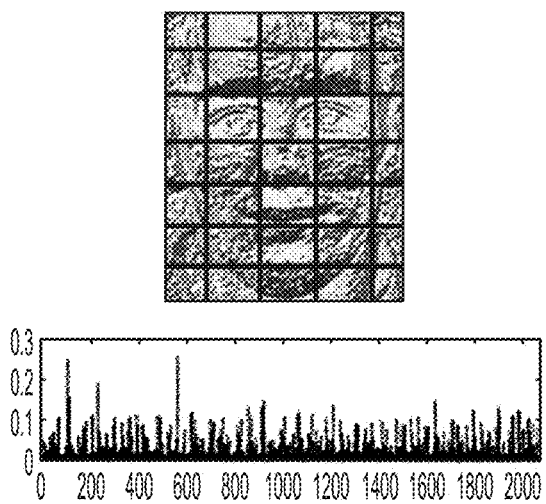

Continuing with FIG. 4, the features in the aligned image frames are extracted at S422. In one embodiment, a standard Local Binary Patterns ("LBP") operator extracts several different orientations and types of edge features in the image, giving equal priority for all patterns that are found. After encoding each pixel in the image with a byte value, a histogram is generated at that spans 58 different uniform patterns (out of 256 total patterns), with a 59th bin that collects all other non-uniform patterns. By calculating a histogram of all patterns over an entire face image, any spatial information is eliminated because the bins in the histogram are accumulated from each pixel. In order to provide spatial context, the facial region in the image can be divided into windows. Each window contributes one histogram. These histograms are then concatenated together to form one large feature vector of size which contains both the textural and spatial information of the face. FIG. 8B shows illustrative LBP features extracted for a facial region. FIG. 8A shows the facial region first divided into windows. Choosing the number of splits (m rows, n columns) is dependent on the resolution of the face image, and can affect the classification accuracy. In the contemplated embodiment, a facial image resolution of around 150×120 pixels, m=7 and n=5 can be a starting point.

Another approach for extracting features at S422 includes generating Histogram of Gradient ("HoG") features. The general idea behind HoG features is to count the number of occurrences of gradient orientations in local regions of an image. In the case images containing facial expressions, these gradients often correspond to areas around the mouth, nose, eyes, the edges and folds of the skin that occur during deformation, facial hair and marks, etc.

Figure 9A:
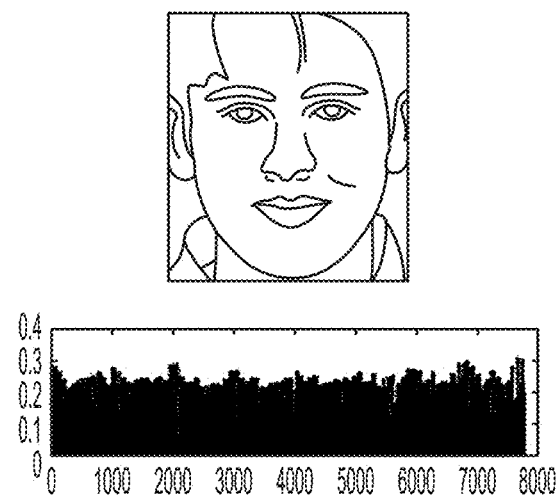
FIG. 9A-B shows illustrative HoG features extracted for a facial region.
Figure 9B:
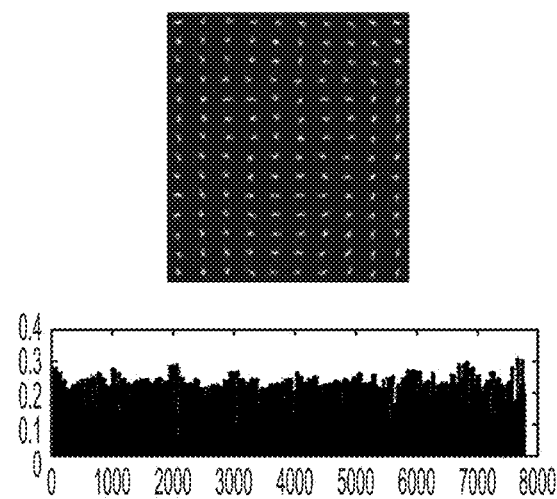

The general procedure for calculating HoG features consists of first dividing the image into smaller cells. However, the size of the cell can affect the performance of the classification results. When the cell size is large, more large-scale spatial information is captured. When the cell size is reduced, small-scale details in the image are better captured. Next, a local 1-D histogram is generated from the gradient directions of each pixel that is contained in the cell. In order to increase robustness to uneven lighting conditions, these histograms can be normalized based on larger characteristics of neighboring cells that have been grouped together to form blocks (which may involve clipping maximum values for some gradient directions). FIG. 9B shows illustrative HoG features extracted for the facial region shown in FIG. 9A. All histograms from all cells are then concatenated to form a final feature descriptor.

The choice of parameters regarding block size, block overlap, bin size, and gradient filter can also affect the performance of the classification results. In one embodiment, the HoG features can be generated using a cell size of 64 pixels (i.e., 8×8 pixels); a block size of 9; a block overlap of ¾; a bin size of 36; and the Prewitt operator as a gradient filter.

Returning to FIG. 4, at S424, the extracted features are processed to determine a facial characteristic. In one embodiment, the eye-related features are processed for each image frame to assign a running blink rate for each frame in the video sequence. Any known blink detection algorithm can be used to compute the blink rate, including motion-based approaches—such as that disclosed by Pan, L. Sun, Z. Wu and S. Lao, in "*Eyeblink-based Anti-Spoofing in Face Recognition from a Generic Webcamera*," in Computer Vision, 2007; ICCV 2007; and IEEE 11th International Conference on, Rio de Janeiro, 2007, pp. 1-8—and template-based approaches—such as that disclosed by M. Awais, N. Badruddin and M. Drieberg in "*Automated eye blink detection and tracking using template matching*," in Research and Development (SCOReD), 2013 IEEE Student Conference, Putrajaya, 2013, pp. 79-83—the contents of each of which are fully incorporated by reference herein.

In a different, illustrative embodiment, the head motion can be determined using the course tracks for each facial landmark detected using the DPM described above. Alternatively, head motion can be estimated using dense optical flow based techniques. There is no limitation made herein to the facial characteristic determined and the technique used by the calibration unit 302 to determine the facial characteristic using the input vectors.

At S426, the classifier training module 326 annotates the HoG or LBP feature vector of the image frame(s) with a label assigning the facial characteristic to the features. At S428, the module 326 trains the classifier 328 on the calibration set of image frames of the subject taking the calibration task, whereby the frames include the feature vectors annotated by labels of the represented training images.

Using the trained classifier, the system 300 can detect the subject's emotional state during a later assessment. Subsequent to the training of the classifier, the image buffer 324 receives a second set of image data from a camera 304 capturing the subject during an assessment or assignment administered to the subject at S430. An image feature vector is generated to represent the current image(s) by the same operations that were described, supra, to generate the feature vector representing the calibration images. The feature vector is applied to the classifier 328 at S432, and a classification value for the input image is generated by the classifier and is effective to classify the emotional state of the subject. The method ends at S434.

One aspect of the present disclosure is that a user, in an educational setting for example, can determine the emotional state and condition of a student subject during an assessment. One aspect of the camera being embedded in the mobile computing device, such as a tablet, that is being used by the student is that it can continually capture the student's facial expressions as the student interacts with the mobile computing device during an assessment or assignment. Another aspect of the classification technique provided in the present disclosure is that it can provide meaningful information to educators about the student's participation, engagement and learning.

Although the control method 400 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 400, wherein the disclosure is not limited to the specific applications and embodiments illustrated and described herein.

Experiment 1—Conventional Approach

Over one hundred (100) participants were administered a quiz game on a tablet computer. Each participant had an equal amount of time to answer as many questions as possible. The session was restricted to a fixed amount of time that was unknown to the participant until a final countdown timer appeared on the display screen showing the participant that only fifteen (15) seconds remained. Participants that correctly answered questions were rewarded points based on the difficulty of the question. A reward for the top two scores was given.

Figure 1:
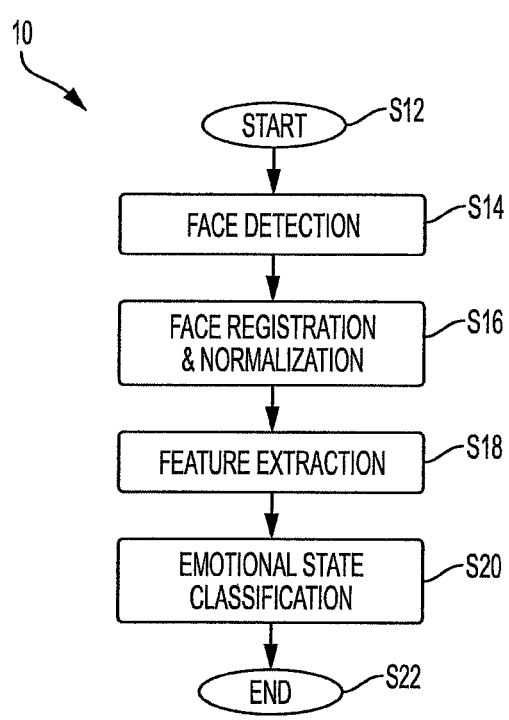
FIG. 1 shows a conventional facial recognition approach according to the PRIOR ART.

In this experiment, the conventional approach shown in FIG. 1 was implemented on the tablet computer: (1) facial landmark detection was performed using both the Viola-Jones face detection approach in conjunction with the subspace constrained mean-shift algorithm; (2) a face that was front facing and well aligned to the camera was chosen to represent the canonical representation of the face coordinates (eyes, ears, etc.), where all subsequent faces were spatially warped to match this arrangement; (3) histogram equalization and median filtering was then performed to reduce the effects of lighting and noise; and (4) uniform LBP features were extracted using 5×7 windows on the face, resulting in a feature vector of dimension 5×7×59=2065.

In total, 109 smile expression frames were extracted from several subjects, as well as 59 neutral expression frames. The results showed that 90% of the smiles were detected. However in many cases, the smile expressions are very subtle, resulting in a large number of false positives with neutral expressions.

Experiment 2—Presently Disclosed Approach

Figure 10A:
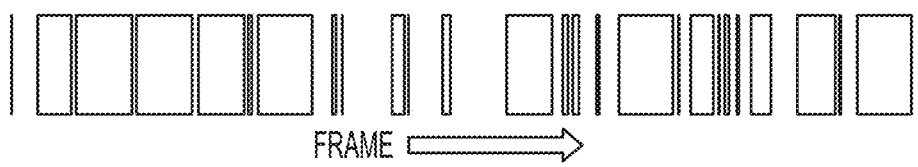
FIG. 10A shows the results of an experiment where the participant is captured in a neutral emotional state.
Figure 10B:
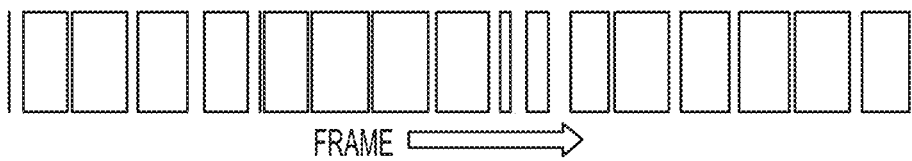
FIG. 10B shows the results the experiment where the participant is captured in a heightened emotional state.

In the second experiment, deviations detected from the normal facial expression of the participant playing the reward-based quiz game were analyzed. For this experiment, a 1-class SVM classifier was trained on the first 15 seconds of the video (roughly 450 frames), then tested on the next 15 seconds (first test set) and then on the last 15 seconds of the video (second test set). In the first 30 seconds, the subject entered his/her name, email address, and read the quiz game instructions. The login phase of the quiz is a no-pressure scenario on the participant. In FIG. 10a, the results are shown for the 15 seconds of the first test set immediately following the training segment. In FIG. 10b, the results of the second test set (final 15 seconds) of the video show that the participant is under pressure. The black denotes deviations from the norm inferred by classification labels given by the SVM classifier. Overall, the deviations increased from 64% to 85% between the first and second video segments.

In other words, 64% of the frames deviated from the "normal" facial expressions shown in the first 15 seconds of the video to the next 15 seconds, while 86% of the frames deviated from the normal facial expression in the last 15 seconds where the subject is under "pressure" (when the countdown timer started).

Figure 11A:
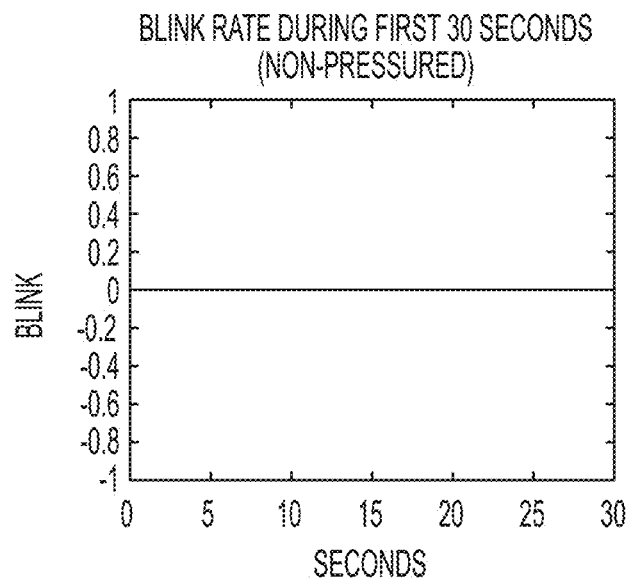
FIGS. 11A-B are plots from an experiment showing the blink rate between two different video segments (frame sequences) for a participant administered a quiz.
Figure 11B:
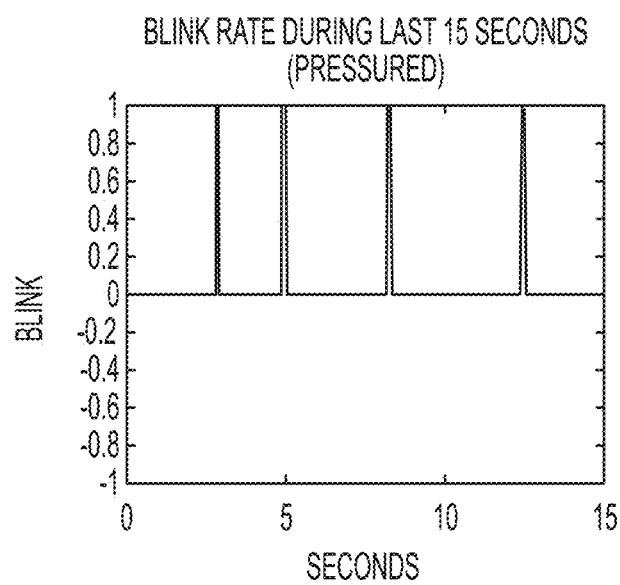

Blink rates were also examined during the same segments of video. FIGS. 11A-B are plots from an experiment showing the blink rate between two different video segments (frame sequences) for a participant administered a quiz. A value of "1" represents that the eye lid was closed while a value of "0" represents that the eye lid is open. As the plots demonstrate, the blink rates increased during the high-pressure (more difficult quiz portions, as reflected in the corresponding) segment of the video, which suggests that the stress emotion was successfully elicited by the quiz game.

Figure 12A:
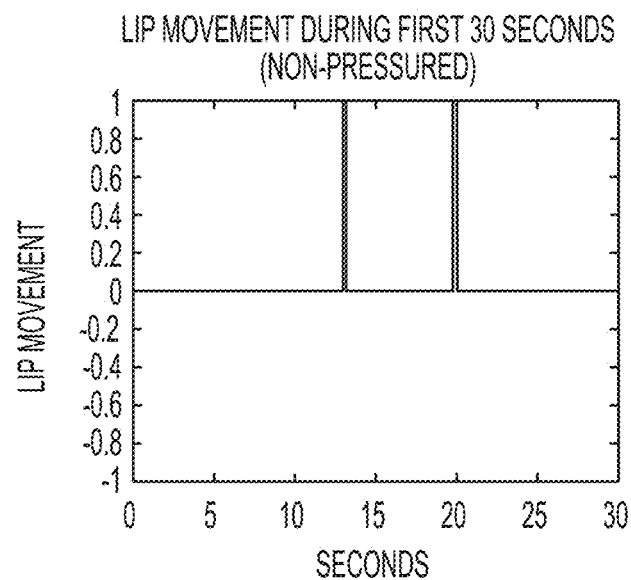
FIGS. 12A-B are plots from the experiment showing lip movement between two different video segments (frame sequences) for a participant administered a quiz.
Figure 12B:
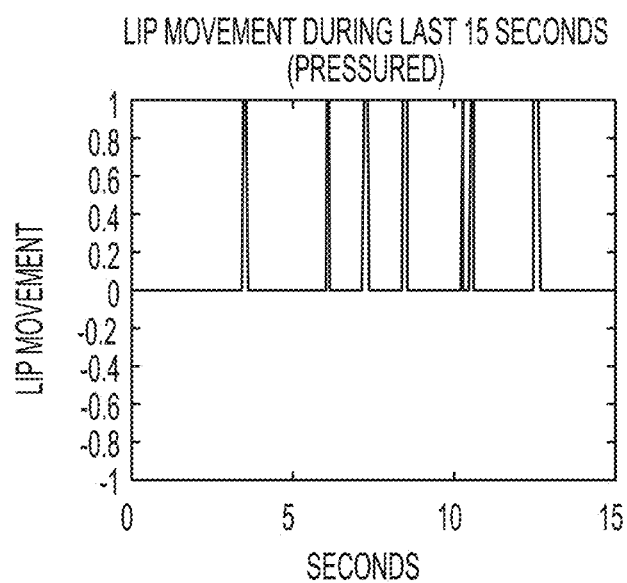

Similarly, FIGS. 12A-B are plots from the experiment showing lip movement between the two different video segments (frame sequences) for the participant administered a quiz.

The results of the experiment show an increased amount of lip motion during the high-pressure (more difficult quiz portions, as reflected in the corresponding) segment of the video.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining an emotional state of a subject taking an assessment, the method comprising:
   generating a calibration task to elicit predicted responses from an associated subject administered the task, wherein each portion of the task is intended to elicit a certain emotional response that conveys a baseline characteristic of the associated subject;
   receiving video data capturing the associated subject performing the calibration task, wherein each frame of the video data is synchronized within the task to correspond to a portion of the task;
   processing the video data for determining an observable physical behavior experienced by the associated subject across a series of frames during the each portion of the task;
   detecting an emotional response experienced by the associated subject across the series of frames corresponding to the each portion of the task;
   associating (or tagging) the observed behavior with one of multiple emotional categories (or labels), wherein each category (or label) corresponds with one of the emotional responses; and,
   training a classifier using the features extracted from the image data, where each class is one of the categories associated with the observed behavior.

2. The method of claim 1, wherein the calibration task that is used for training includes:
   a first class including a set of elicited behaviors associate associated with a neutral and relaxed emotional state; and
   a second class that includes all other elicited behaviors, wherein a baseline is established for the associated subject by training the classifier on the features extracted from the image data from both the first and second classes to learn the neutral and relaxed emotional state of the associated subject.

3. The method of claim 1, wherein the calibration task includes multiple questions across a range of difficulty levels, wherein at least two questions are different levels of difficulty, wherein each level of difficulty corresponds with a different one of the predicted responses and the each portion of the task is intended to elicit the certain emotional response.

4. The method of claim 1 further comprising:
using a mobile computing device including the image capture device, monitoring the associated subject during an administration of the calibration task to the associated subject.

5. The method of claim 1, wherein each certain emotional response is a predicted facial expression that conveys the emotional state of the associated subject.

6. The method of claim 1 further comprising:
receiving second image data capturing the associated subject during an assessment administered after the calibration task;
applying features extracted from the second image data to the classifier for determining the emotional state of the associated subject in response to an assessment item administered during the assessment.

7. The method of claim 1 further comprising:
using a sensor, monitoring the associated subject during the calibration task, wherein the sensor measures a biometric indicative of the emotional state of the associated subject.

8. The method of claim 1 further comprising:
receiving the image data capturing at least two associated subjects performing the calibration task, wherein the calibration task includes questions covering at least two topics;
detecting observable physical behaviors experienced by the at least two associated subjects during the each portion of the task;
in response to determining a pattern of similarity between the observable physical behaviors, associating (or tagging) the observed behavior with one of multiple emotional categories (or labels), wherein each category (or label) corresponds with one of the intended emotional responses;
training the classifier using the associations.

9. The method of claim 1, wherein the processing the image data includes:
detecting the associated subject in an image frame of the image data;
applying a landmark detection (or Viola-Jones facial detector) algorithm to the image frame to determine a facial region;
applying a deformable part-based model (DPM) to determine a region of interest in the facial region corresponding to a facial landmark of the associated subject;
extracting features in the region of interest;
associating the features with an emotional category; and
training the classifier using the association.

10. The method of claim 9, further comprising:
generating feature histograms from one or more of the extracted features;
concatenating the extracted features to generate a final feature descriptor; and,
training the classifier using the final feature descriptor.

11. The method of claim 9, wherein the processing the image data further includes:

performing a coordinate transform on the region of interest across multiple image frames.

12. A method for determining an emotional state of a subject taking an assessment, the method comprising:
generating sample questions to elicit predicted facial expressions from an associated subject administered the questions, wherein each question is intended to elicit a certain facial expression that conveys a baseline characteristic of the associated subject;
receiving a video sequence capturing the associated subject answering the questions, wherein each frame of the video sequence is synchronized within a sample question;
determining an observable physical behavior experienced by the associated subject across a series of frames corresponding to the sample question;
detecting a facial expression conveyed by the associated subject across the series of frames corresponding to the question;
associating (or tagging) the observed behavior with the emotional state that corresponds with the facial expression;
training a classifier using the associations;
receiving a second video sequence capturing the associated subject during an assessment administered after the sample questions;
applying features extracted from the second image data to the classifier for determining the emotional state of the associated subject in response to an assessment item administered during the assessment.

13. A calibration system for determining an emotional state of a subject taking an assessment, the system comprising:
a processor, and
a non-transitory computer readable memory storing instructions that are executable by the processor to perform the operations of:
generating a calibration task to elicit predicted responses from an associated subject administered the task, wherein each portion of the task is intended to elicit a certain emotional response that conveys a baseline characteristic of the associated subject;
receiving image data from an image capture device capturing the associated subject performing the calibration task, wherein each frame of the image data is synchronized to correspond to a portion of the task;
determining an observable physical behavior experienced by the associated subject across a series of frames during the portion of the task;
detecting an emotional response experienced by the associated subject across the series of frames corresponding to the portion of the task;
associating (or tag) the observed behavior with one of multiple emotional categories (or labels), wherein each category (or label) corresponds with one of the emotional responses;
training a classifier using the associations;
receiving second image data capturing the associated subject during an assessment administered after the calibration task; and,
applying features extracted from the second image data to the classifier for determining the emotional state of the associated subject in response to an assessment item administered during the assessment.

14. The system of claim 13, wherein the calibration task includes multiple questions across a range of difficulty levels, wherein at least two questions are different levels of difficulty, wherein each level of difficulty corresponds with a different one of the predicted responses and the each portion of the task is intended to elicit the certain emotional response.

15. The system of claim 13 further comprising:
a mobile computing device including the image capture device for monitoring the associated subject during an administration of the calibration task to the associated subject.

16. The system of claim 13, wherein each certain emotional response is a predicted facial expression that conveys the emotional state of the associated subject.

17. The system of claim 13 further comprising:
a sensor for monitoring the associated subject during the calibration task, wherein the sensor measures a biometric indicative of the emotional response is a measurement of stress.

18. The system of claim 13, wherein the processor is further programmed to perform the operations of:
receiving image data capturing at least two associated subjects performing the calibration task, wherein the calibration task includes questions covering at least two topics;
determining observable physical behaviors experienced by the at least two associated subjects during the each portion of the task;
in response to determining a pattern of similarity between the observable physical behaviors, associating (or tagging) the observed behavior with one of multiple emotional categories (or labels), wherein each category (or label) corresponds with one of the intended emotional responses; and,
training a classifier using the associations.

19. The system of claim 13, wherein the processor is further programmed to perform the operations of:
detecting the associated subject in an image frame of the image data;
applying a landmark detection (or Viola-Jones facial detector) algorithm to the image frame to determine a facial region;
applying a deformable part-based model (DPM) to determine a region of interest in the facial region corresponding to a facial landmark of the associated subject;
extracting features in the region of interest;
associating the features with an emotional category; and
training the classifier using the association.

20. The system of claim 18, wherein the processor is further programmed to perform the operations of:
generating a Histogram of Features (HoG) using the extracted features;
concatenating the gradients to generate a final feature vector; and,
training the classifier using the final feature vector.

21. The system of claim 18, wherein the processor is further programmed to perform the operation of:
performing a coordinate transform on the region of interest across multiple image frames (or align the facial landmark across the multiple frames using a geometric transform).

* * * * *